United States Patent
Schwarz et al.

(10) Patent No.: US 10,443,612 B2
(45) Date of Patent: Oct. 15, 2019

(54) HOLLOW FAN BLADE WITH STIR WELDED COVER SUPPORT

(71) Applicant: United Technologies Corporation, Hartford, CT (US)

(72) Inventors: Frederick M. Schwarz, Glastonbury, CT (US); Michael A. Weisse, Tolland, CT (US)

(73) Assignee: United Technologies Corporation, Farmington, CT (US)

( * ) Notice: Subject to any disclaimer, the term of this patent is extended or adjusted under 35 U.S.C. 154(b) by 546 days.

(21) Appl. No.: 15/102,155

(22) PCT Filed: Dec. 16, 2014

(86) PCT No.: PCT/US2014/070624
§ 371 (c)(1),
(2) Date: Jun. 6, 2016

(87) PCT Pub. No.: WO2015/095205
PCT Pub. Date: Jun. 25, 2015

(65) Prior Publication Data
US 2016/0305443 A1     Oct. 20, 2016

Related U.S. Application Data

(60) Provisional application No. 61/916,695, filed on Dec. 16, 2013.

(51) Int. Cl.
*F04D 29/38*     (2006.01)
*F01D 5/18*       (2006.01)
(Continued)

(52) U.S. Cl.
CPC ........... *F04D 29/388* (2013.01); *B23K 20/122* (2013.01); *F01D 5/147* (2013.01);
(Continued)

(58) Field of Classification Search
CPC .......... F01D 5/147; F01D 5/18; F04D 29/388; F04D 29/325; F02C 3/04; B23K 20/122
See application file for complete search history.

(56) References Cited

U.S. PATENT DOCUMENTS 6,039,542 A  *  3/2000  Schilling ................... F01D 5/16
                                                              416/224
7,189,064 B2 *  3/2007  Helder ................. B23K 20/122
                                                              416/232

(Continued)

OTHER PUBLICATIONS

Extended European Search Report, for European Patent Application No. 14873099.7, dated Nov. 18, 2016, 8 pages.

(Continued)

*Primary Examiner* — Brian P Wolcott
(74) *Attorney, Agent, or Firm* — Kinney & Lange, P.A.

(57) ABSTRACT

An airfoil for a turbine engine includes an airfoil body with a cover mounting support, a first cover, and a second cover. The airfoil body includes a solid perimeter portion surrounding a recess formed into at least one of a suction side and a pressure side of the airfoil body, while the cover mounting support extends through the recess. The first cover can be engaged with a first edge of the recess and joined to a first portion of the cover mounting support by a first stir weld. The second cover can be engaged with a second edge of the recess, and joined to a second portion of the cover mounting support by a second stir weld.

24 Claims, 5 Drawing Sheets

(51) Int. Cl.
  *B23K 20/12* (2006.01)
  *F02C 3/04* (2006.01)
  *F04D 29/32* (2006.01)
  *F01D 5/14* (2006.01)
  *B23K 101/00* (2006.01)

(52) U.S. Cl.
  CPC .................. *F01D 5/18* (2013.01); *F02C 3/04* (2013.01); *F04D 29/325* (2013.01); *B23K 2101/001* (2018.08); *F05D 2220/36* (2013.01); *F05D 2230/239* (2013.01); *Y02T 50/671* (2013.01); *Y02T 50/676* (2013.01)

(56) References Cited

U.S. PATENT DOCUMENTS

| | | | | |
|---|---|---|---|---|
| 7,487,901 B2* | 2/2009 | Talwar | ............... | B23K 20/1225 228/112.1 |
| 7,980,817 B2* | 7/2011 | Foose | ..................... | F01D 5/147 415/191 |
| 8,944,773 B2* | 2/2015 | Weisse | ................... | F01D 5/147 416/229 R |
| 9,169,731 B2* | 10/2015 | Hui | ......................... | F01D 5/141 |
| 9,221,120 B2* | 12/2015 | Schwarz | ................. | F01D 5/147 |
| 2005/0254955 A1 | 11/2005 | Helder et al. | | |
| 2013/0039774 A1 | 2/2013 | Viens et al. | | |
| 2013/0108470 A1 | 5/2013 | Weisse | | |
| 2013/0167555 A1 | 7/2013 | Schwarz et al. | | |

OTHER PUBLICATIONS

International Search Report and Written Opinion for Application No. PCT/US2014/070624, dated Mar. 16, 2015, 10 pages.

International Preliminary Report on Patentability, for PCT Patent Application No. PCT/US2014/070624, dated Jun. 21, 2016, 9 pages.

* cited by examiner

HOLLOW FAN BLADE WITH STIR WELDED COVER SUPPORT

BACKGROUND

The described subject matter relates generally to turbine engines, and more specifically to airfoils for turbine engines.

When used on aircraft, gas turbine engines typically include a fan delivering air into a bypass duct and into a compressor section. Air from the compressor is passed downstream into a combustion section where it is mixed with fuel and ignited. Products of this combustion pass downstream over turbine rotors driving them to rotate. Turbine rotors drive the compressor and fan rotors.

Historically, the fan rotor was driven at the same speed as a turbine rotor. More recently, it has been proposed to include various gear reduction schemes to optimize the efficiency of both the fan and the compressor. This generally allows for increased fan diameters and resultant increases in the volume of air delivered into the bypass duct relative to the power core. With this relative increase in what is generally described as the bypass ratio, the relative weight and stresses on fan blades increases accordingly. At higher bypass ratios, the additional airfoil and attachment mass needed to reinforce traditional hollow fan blade constructions against bird strikes and other foreign object damage (FOD) can offset many efficiency gains from higher bypass flows. While certain hollow blade constructions such as certain diffusion bonded arrangements, can achieve weight savings, such blades are difficult to scale up to a high-throughput process without substantial investments.

SUMMARY

An airfoil is disclosed which includes an airfoil body with a cover mounting support, a first cover, and a second cover. The airfoil body includes a solid perimeter portion surrounding a recess formed into at least one of a suction side and a pressure side of the airfoil body, while the cover mounting support extends through the recess. The first cover can be engaged with a first edge of the recess and joined to a first portion of the cover mounting support by a first stir weld. The second cover can be engaged with a second recess edge, and joined to a second portion of the cover mounting support by a second stir weld.

A turbofan engine includes a compressor section, a combustor section, a turbine section, and a fan section. The fan section has a plurality of airfoils connected to a fan hub, and each fan blade includes an airfoil body with a cover mounting support, a first cover, and a second cover. The airfoil body includes a solid perimeter portion surrounding a recess formed into at least one of a suction side and a pressure side of the airfoil body. The cover mounting support extends through the recess. The first cover is engaged with a first edge of the recess and joined to the cover mounting support by a first stir weld. The second cover is engaged with a second edge of the recess, and joined to the cover mounting support by a second stir weld.

A method of making an airfoil includes providing an airfoil body with a solid perimeter portion surrounding a recess and a cover mounting support extending through the recess. A first cover piece is engaged with a first edge of the recess, and a second cover piece is engaged with a second edge of the recess opposite the first edge. At least the first cover piece and the second cover piece are joined to the cover mounting support by at least one stir weld.

DETAILED DESCRIPTION

Figure 1:
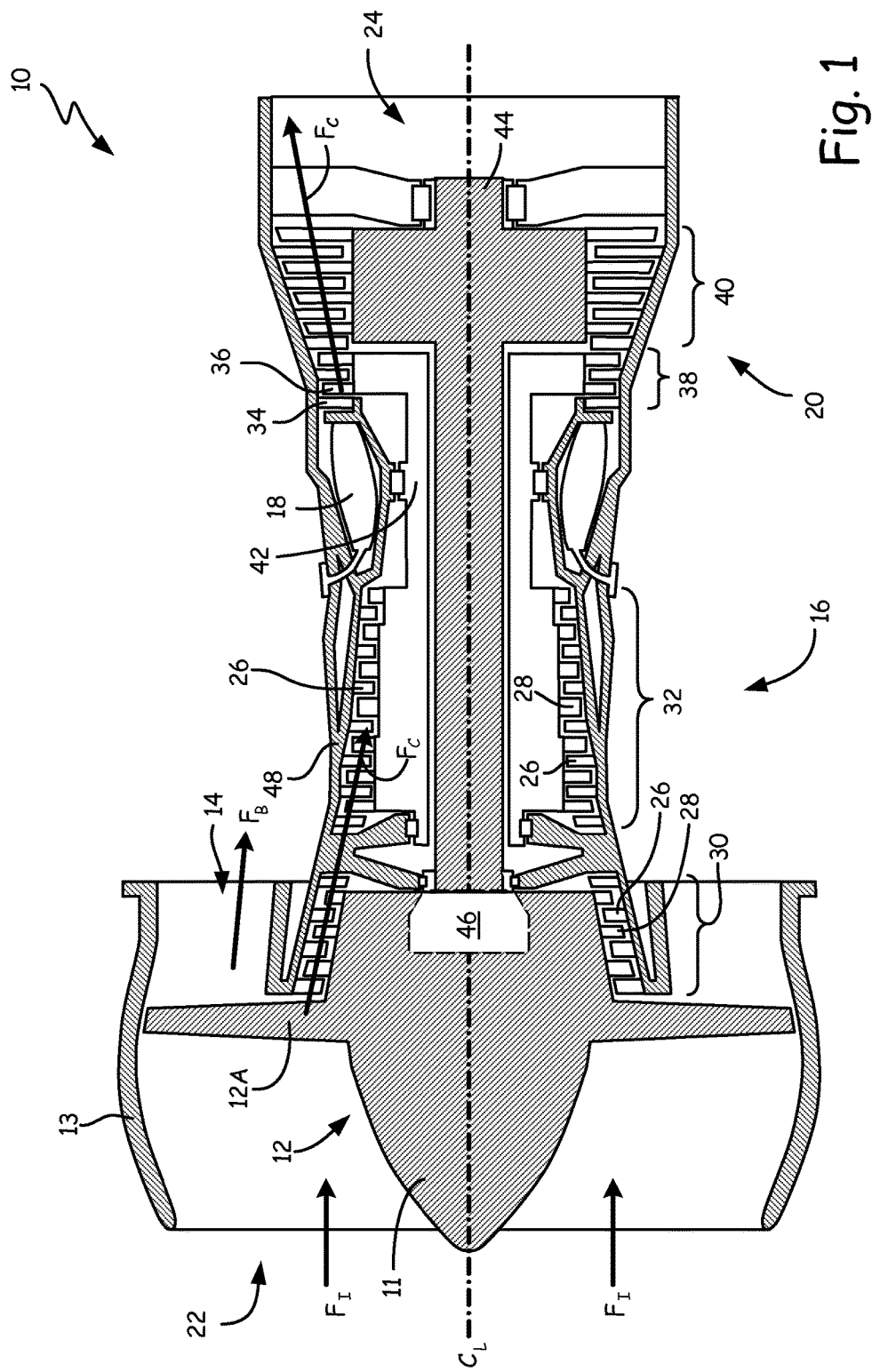
FIG. 1 is a perspective view of a gas turbine engine.

FIG. 1 is a cross sectional view of gas turbine engine 10 in a turbofan environment. As shown in FIG. 1, turbine engine 10 includes fan 12 with at least one fan rotor positioned in bypass duct 14. Bypass duct 14 can be oriented about a turbine core comprising compressor section 16, combustor (or combustors) 18, and turbine section 20, arranged in flow series with upstream inlet 22 and downstream exhaust stream 24.

In the example dual-spool configuration shown in FIG. 1, compressor 16 includes stages of compressor vanes 26 and blades 28 arranged in low pressure compressor (LPC) section 30 and high pressure compressor (HPC) section 32. Turbine 20 has stages of turbine vanes 34 and turbine blades 36 arranged in high pressure turbine (HPT) section 38 and low pressure turbine (LPT) section 40. HPT section 38 can be coupled to HPC section 32 via HPT shaft 42, forming the high pressure spool or high spool. LPT section 40 can similarly be coupled to LPC section 30 via LPT shaft 44, forming the low pressure spool or low spool. HPT shaft 42 and LPT shaft 44 are typically coaxially mounted, with the high and low spools independently rotating about engine axis/center line ($C_L$).

Fan 12 typically includes a plurality of fan airfoils 12A circumferentially arranged around at least one fan hub 11 or other rotating member(s) in fan shroud 13. Fan hub 11 can be coupled either directly or indirectly to LPC section 30 and driven by LPT shaft 44. In certain embodiments, fan hub 11 is coupled via epicyclic gear system 46 linked to a fan shaft (not visible in FIG. 1), providing reduction of the fan speed relative to the speed of the rest of the low spool. In certain embodiments, epicyclic gear system 46 is configured to provide independent fan speed control, such as by utilizing a variable gear ratio.

As shown in FIG. 1, fan 12 is forward mounted and provides thrust by accelerating flow downstream through bypass duct 14, for example, in a high bypass configuration suitable for commercial and regional jet aircraft operations. Alternatively, fan 12 may be an unducted fan or propeller assembly, in either a forward or aft mounted configuration. In these various embodiments, turbine engine 10 comprises any of a high bypass turbofan, a low bypass turbofan or a turbo prop engine, in which the number of spools and shaft configurations may vary. In operation of turbine engine 10, incoming airflow $F_I$ enters inlet 22 and divides into core flow $F_C$ and bypass flow $F_B$ downstream of fan hub(s) 11. Core flow $F_C$ propagates along the core flow path through compressor section 16, combustor 18, and turbine section 20, while bypass flow $F_B$ propagates along the bypass flowpath through bypass duct 14. The one or more stages of LPC section 30 and HPC section 32 are utilized to compress incoming air for combustor 18 where fuel is introduced, mixed with air and ignited to produce hot combustion gas, which serves as a working fluid to drive turbine 20.

Combustion gas exits combustor 18 and enters HPT (section 38) of turbine 20, encountering turbine vanes 34 and turbine blades 36. Turbine vanes 34 turn and accelerate flow, and turbine blades 36 generate lift for conversion to rotational energy via HPT shaft 42, driving HPC section 32 of compressor 16. Partially expanded combustion gas transitions from HPT section 38 to LPT 40, thus driving LPC section 30 and fan 11 via LPT shaft 44. Exhaust flow exits LPT section 40 and turbine engine 10 via exhaust nozzle 24.

Depending on the particular embodiment, fan hub 11 can also provide a degree of compression (or pre-compression) to core flow $F_C$, allowing some or all of LPC section 30 to be omitted. In certain embodiments, engine 10 can be additionally and/or alternatively provided with one or more intermediate spools, for example, in a three-spool turboprop or turbofan configuration.

Thermodynamic efficiency of turbine engine 10 is tied to the overall pressure ratio as defined between the delivery pressure at inlet 22 and the compressed air pressure entering combustor 18 from compressor section 16. In general, a higher pressure ratio offers increased efficiency and improved performance including greater specific thrust. High pressure ratios also result in increased peak gas path temperatures, higher core pressure, and greater flow rates, increasing thermal and mechanical stress on engine components.

One way to achieve large pressure ratios is to provide a large diameter fan 12 (and accompanying large diameter bypass duct 14) relative to the diameter of the engine power core. However, the requirement for longer fan blades can make it difficult to achieve sufficient weight savings to take advantage of efficiency gains from the high bypass ratio. The following figures illustrate an example hollow fan blade construction and method which includes multi-piece covers that are friction stir welded to at least one cover support disposed in a recess. This configuration reduces weight of hollow blades, making titanium fan blades more competitive for use in high bypass engines, including in geared turbofans.

Figure 2:
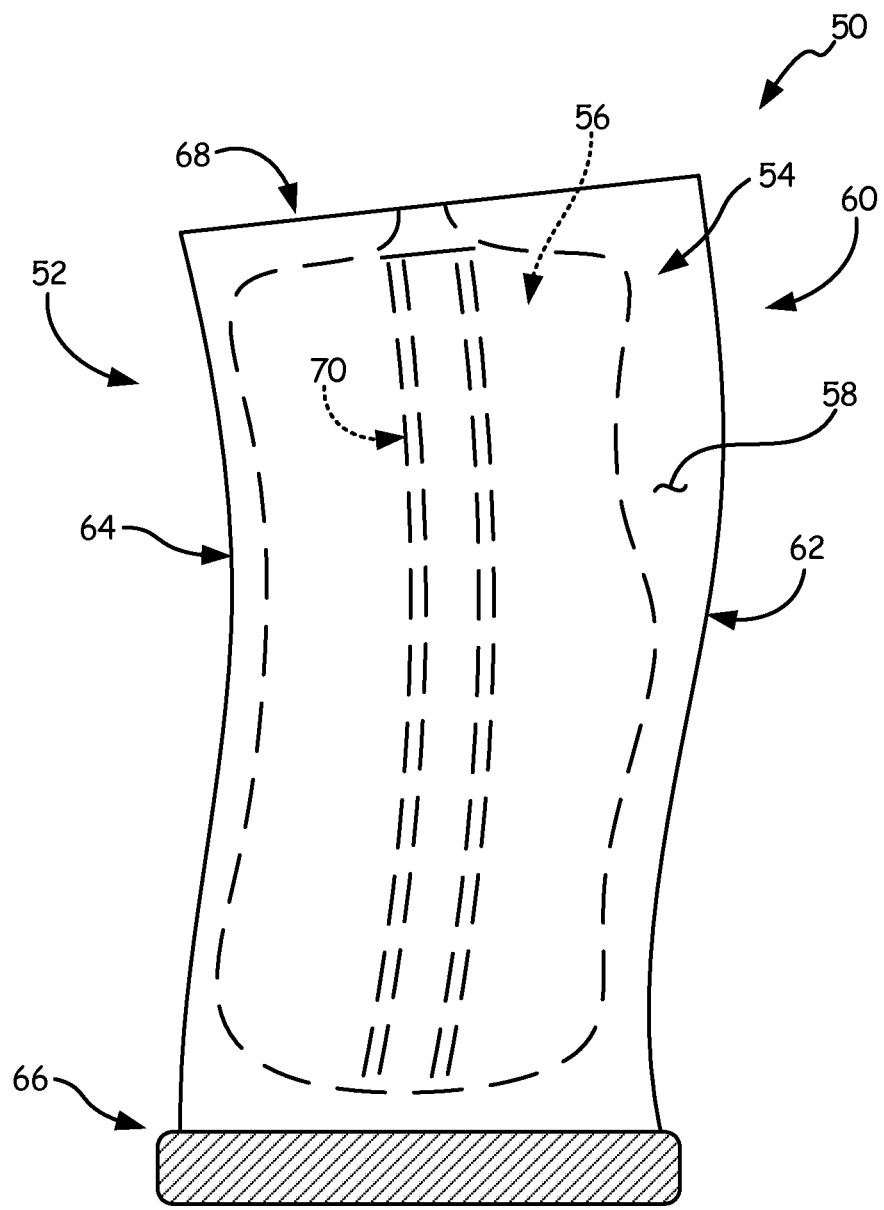
FIG. 2 shows a fan blade for use in a gas turbine engine.

FIG. 2 shows example embodiment of blade 50 according to the present disclosure. Blade 50 can be used as, for example, one or more fan blades 12A secured to fan hub 11 (shown in FIG. 1). As seen in FIG. 2, airfoil body 52 includes solid perimeter portion 54 surrounding recess 56 formed into at least one of a suction side and a pressure side of airfoil body 52. The external profile of airfoil body 52, after incorporation of the covers described below, is similar to known airfoil profiles, with a respective suction sidewall 58 and pressure sidewall 60 extending chordwise between leading edge 62 and trailing edge 64, and spanwise between attachment region 66 and tip region 68. As will be seen in more detail in subsequent figures, one or more of these sidewalls are formed from solid perimeter portion 54 and a plurality of covers stir welded to cover mounting support 70 spaced apart from the edges of recess 56.

Figure 3:
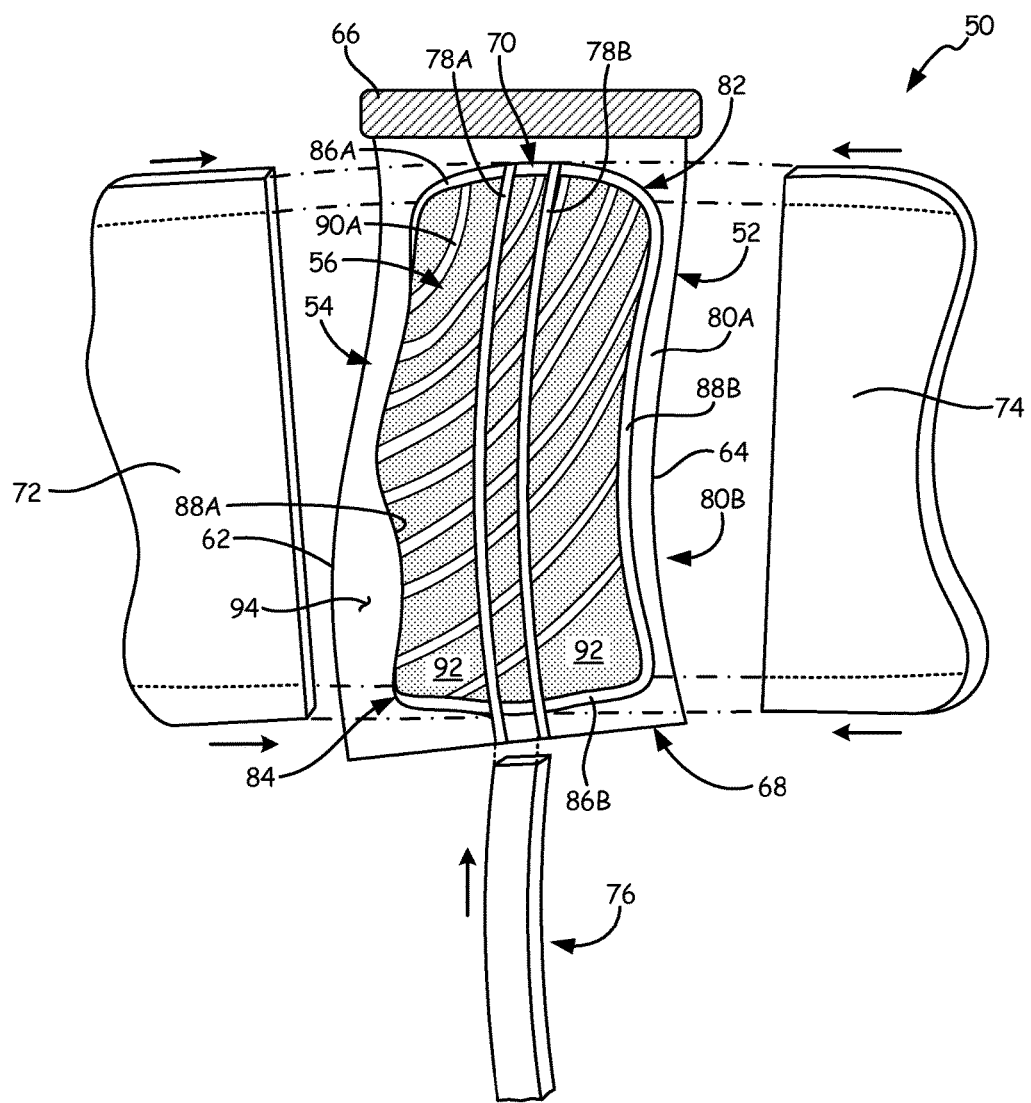
FIG. 3 is an exploded view of a fan blade with multiple covers and an airfoil body.
Figure 4:
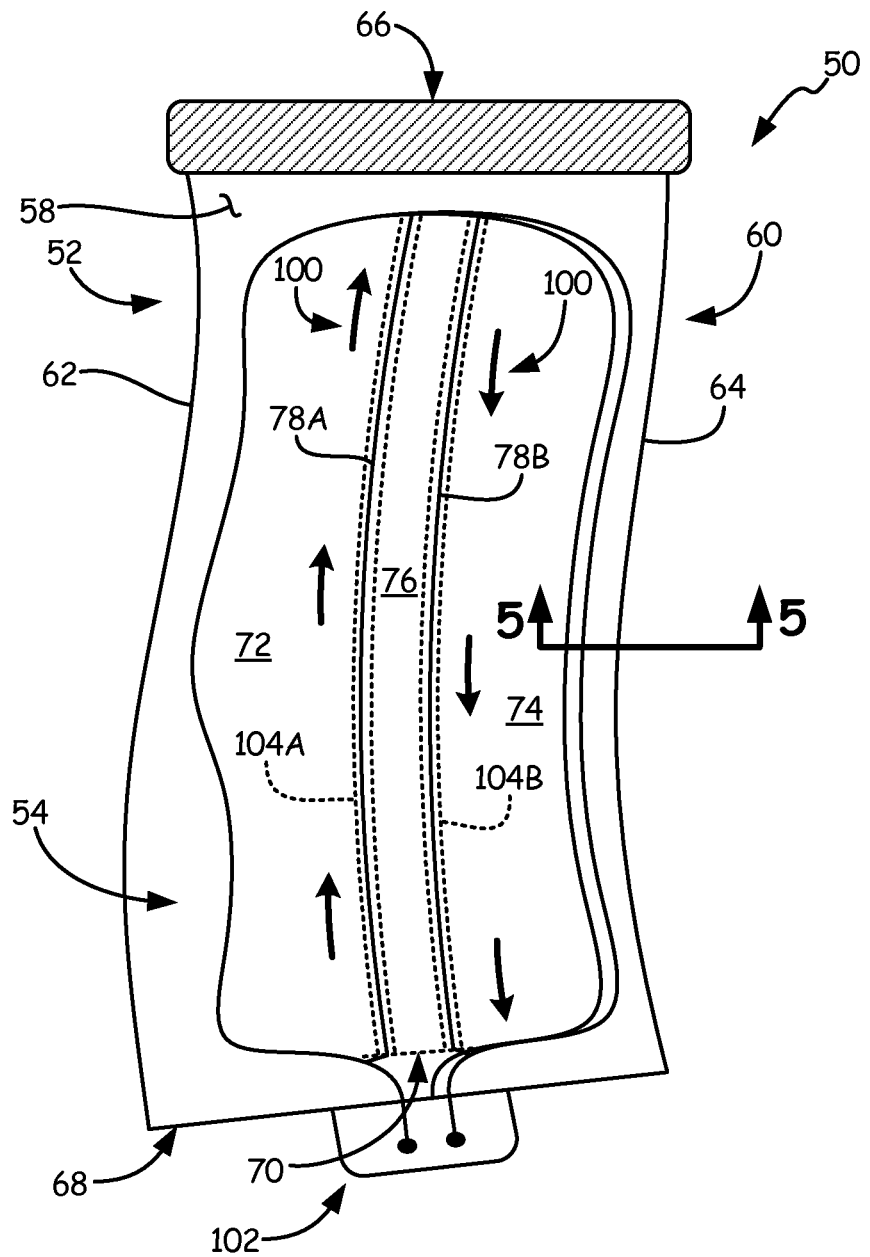
FIG. 4 shows a stir welding path for securing multiple covers to the airfoil body.
Figure 5:
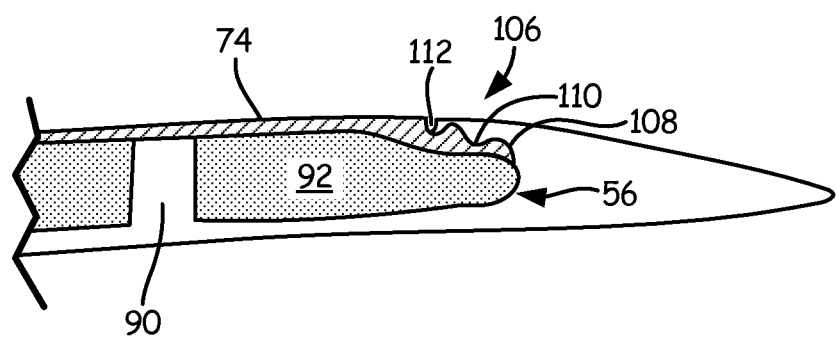
FIG. 5 is a sectional view of an example interface between an edge of the cover and an outer edge of the airfoil recess.

FIG. 3 is an exploded view of blade 50, which generally includes airfoil body 52, cover mounting support 70 extending through recess 56, first cover 72, second cover 74, and optional third cover 76. Covers 72, 74, 76 can be stir welded to cover mounting support 70 along one or more cover edges. In this example, cover mounting support 70 includes one or more ribs extending generally spanwise through recess 56. Here, outer cover edges can engage with one or more recess edges (with or without stir welding) as illustrated in FIGS. 4 and 5.

Recess 56 can be formed into suction side 80A and/or pressure side 80B of airfoil body 52. It will be recognized that the spanwise cover mounting ribs 78A, 78B can be slightly curved, as shown in FIG. 3. This can be done to correspond with the general curvature and camber of airfoil body 52. However, even in this case, cover mounting ribs 78A, 78B extend generally from root side 82 to tip side 84 of recess 56. In certain of these embodiments, cover mounting ribs 78A, 78B substantially abut one or both of root edge 86A and tip edge 86B of recess 56.

FIG. 3 shows that first (e.g., forward) cover 72 can be engaged with a corresponding first or forward edge 88A of recess 56, while second (e.g., aft) cover 74 can similarly be engaged with second or aft edge 88B of recess 56. One or both covers 72, 74 can be engaged with the corresponding recess edges 88A, 88B, for example, using a ship-lap or similar joint (best shown in FIG. 5). And as best shown in FIG. 4, an inner edge of first cover 72 can be joined to a first or forward portion of cover mounting support 70 (e.g., forward cover mounting rib 78A) by a first stir weld and an inner edge of second cover 74 can be joined to a second or aft portion of cover mounting support 70 (e.g., aft cover mounting rib 78B) by a second stir weld. By providing spaced cover mounting ribs, material (and weight) requirements can be minimized while ensuring sufficient weld quality along the cover mounting support. At least one of the first rib and second rib can extend spanwise from a root side to a tip side of recess 56, and that the second spanwise rib can be equally spaced from the first spanwise rib.

Together, as seen in FIG. 3, first cover 72 and second cover 74 define a central portion of suction sidewall 58 surrounded by perimeter portion 54. FIG. 3 also shows third cover 76 disposed between the first and second covers 72, 74. Third cover 76 bridges first and second covers 72, 74, and forms another portion of the airfoil sidewall 58 (or 60). This makes it simpler to proceed with friction stir welding as shown in FIG. 4. And while shown and described in the figures as suction sidewall 58, these arrangements can be readily adapted, additionally or alternatively, to pressure sidewall 60.

It can also be seen that cover mounting support 70 separates recess 56 into two or more recess portions. Being in a substantially spanwise orientation, cover mounting support 70 can divide recess 56 into a forward portion and an aft portion. However, cover mounting support 70 is also limited in its ability to directly reinforce airfoil 52 against foreign object damage which most frequently results in chordwise stresses along leading edge 62. To supplement structural integrity along leading edge 62, a plurality of reinforcement ribs 90A can be disposed in one or more of such portions of recess 56. Here, at least one of the plurality of reinforcement ribs is curved between airfoil leading edge 62 and some or all of cover mounting support 70. This can be done so as to ensure the generally chordwise forces from strikes along or proximate leading edge 62 are converted partially into a spanwise force which can be absorbed and transmitted by spanwise cover mounting support 70 to attachment region 66, and in turn to fan hub 11 (shown in FIG. 1). As seen in FIG. 3, some or all of the spaces between individual adjacent ones of reinforcement ribs 90A can be provided with porous material 92. Material 92, which can be metallic and/or nonmetallic depending on proximity to one or more stir welds, can reduce vibration of covers 72, 74, 76 and add structural integrity to one or both sidewalls 58, 60.

Leading edge 62 (part of solid perimeter 54) can also be provided with region 94 which is thickened in the chordwise direction of airfoil body 52. This region, which can be disposed in the outer half of the airfoil span, can help airfoil body 52 to better withstand foreign object damage. This arrangement of multiple covers which are stir welded to an interior or midchord cover mounting support simplifies hollow fan blade construction, reducing the weight of hollow fan blades particularly at midspan and beyond. These areas are most susceptible to foreign object damage and must be sufficiently strong to meet structural requirements.

Added blade length for large diameter blades can greatly increases stresses on the attachment region, particularly when the outer span of the blade needs to be reinforced to withstand foreign object damage. The amounts of titanium or titanium alloy material can be reduced using diffusion bonding and superplastic deformation processes, but these require large investment of time and resources to provide suitable and economical throughput. The disclosed airfoil construction and method, however, more effectively utilize the internal and external airfoil shape, and makes large diameter titanium alloy blades more competitive for use in high bypass engines, including geared turbofan designs.

FIG. 4 shows weld path 100 for forming blade 50. First stir weld 104A runs along one of the cover mounting ribs 78A, and second stir weld 104B can run along the other adjacent cover mounting rib 78B. Weld runoff area 102 can be provided proximate tip region 68 to assist in evacuating excess weld material from the stir welding apparatus while blade 50 is in an inverted position. Runoff area 102 and any solidified runoff (not shown) can be removed prior to or during finish machining used to form a particular tip shape.

FIG. 5 shows a sectional view of cover 74 engaged with edge 88B around an outer edge of recess 56 (proximate airfoil trailing edge 64). This example engagement of cover edge 106 and recess edge 88B shows a ship lap arrangement by which corresponding ridges 108 along each edge engage with corresponding trench(es) 110. A similar arrangement can be provided for cover 72 (shown in FIG. 3) when engaged about recess edge 88A (also shown in FIG. 3). This ship lap arrangement at the outer edges of recess 56 allows a tight fit between covers 72, 74 and airfoil body 52 around the perimeter of recess 56, while inner edges of covers 72, 74 rest on support 70 (shown in FIG. 3) before being stir welded thereto (shown in FIG. 4).

As shown in FIG. 5. after placement of covers 72, 74 (and optionally cover 76), a small tolerance gap 112 can occur at the interface of one or both cover edges 106 and the corresponding recess edge 88A or 88B. This gap 112 can be filled in and/or finish machined to prevent flow disruption over the blade sidewall (e.g., suction sidewall 58 shown in FIG. 2) during use.

To summarize a method of making an airfoil which is shown and described with respect to FIGS. 1-5, the method can include providing an airfoil body with a solid perimeter portion surrounding a recess and a cover mounting support extending through the recess. The recess can be formed into the airfoil body by machining out excess material from at least one of a suction side and a pressure side of the airfoil body. The body may be derived, for example, from a forging or a casting.

A first cover piece can be engaged with a first edge of the recess, and a second cover piece can be similarly engaged with a second edge of the recess disposed opposite the first edge. At least the first cover piece and the second cover piece are then joined to the cover mounting support by at least one stir weld.

In certain embodiments, a third cover piece can be used to bridge the first and second cover pieces. In certain of these embodiments, the first, second, and third cover pieces are joined to the cover mounting support by at least one stir weld. The third cover piece can be joined by stir welding a junction of the first and second cover pieces along the cover mounting support (See, e.g., stir welding path 100 in FIG. 4).

Also, the cover mounting support can include one or more spanwise cover mounting ribs (such as a plurality of spaced apart spanwise cover mounting ribs 78A, 78B) separating the recess into a forward portion and an aft portion. In addition to airfoil body can also include a plurality of reinforcement ribs (such as reinforcement ribs 90) disposed in at least one of the forward portion and the aft portion of the recess. A porous (metallic and/or nonmetallic) material can be placed between individual ones of the plurality of reinforcement ribs.

DISCUSSION OF POSSIBLE EMBODIMENTS

The following are non-exclusive descriptions of possible embodiments of the present invention.

An airfoil is disclosed which includes an airfoil body with a cover mounting support, a first cover, and a second cover. The airfoil body includes a solid perimeter portion surrounding a recess formed into at least one of a suction side and a pressure side of the airfoil body, while the cover mounting support extends through the recess. The first cover can be engaged with a first edge of the recess and joined to a first portion of the cover mounting support by a first stir weld. The second cover can be engaged with a second recess edge, and joined to a second portion of the cover mounting support by a second stir weld.

The airfoil of the preceding paragraph can optionally include, additionally and/or alternatively, any one or more of the following features, configurations and/or additional components:

An airfoil according to an exemplary embodiment of this disclosure, among other possible things includes an airfoil body including a solid perimeter portion surrounding a recess formed into at least one of a suction side and a pressure side of the airfoil body; a cover mounting support extending through the recess; a first cover engaged with a first edge of the recess and joined to a first portion of the cover mounting support by a first stir weld; and a second cover engaged with a second edge of the recess, and joined to a second portion of the cover mounting support by a second stir weld.

A further embodiment of the foregoing airfoil, wherein the first cover and the second cover define a central portion of an airfoil sidewall surrounded by a perimeter portion of the airfoil body.

A further embodiment of any of the foregoing airfoils, wherein the airfoil sidewall is at least one of: a suction sidewall, and a pressure sidewall.

A further embodiment of any of the foregoing airfoils, wherein the airfoil further comprises a third cover portion disposed between the first and second cover portions.

A further embodiment of any of the foregoing airfoils, wherein the third cover portion bridges the first and second cover portions, and forms a third portion of the sidewall.

A further embodiment of any of the foregoing airfoils, wherein the airfoil body comprises titanium or an alloy thereof.

A further embodiment of any of the foregoing airfoils, wherein the cover mounting support comprises a first rib extending spanwise from a root side to a tip side of the recess.

A further embodiment of any of the foregoing airfoils, wherein the cover mounting support further comprises a second spanwise rib equally spaced from the first spanwise rib.

A further embodiment of any of the foregoing airfoils, wherein the cover mounting support separates the recess into a forward portion and an aft portion.

A further embodiment of any of the foregoing airfoils, wherein the airfoil further comprises a plurality of reinforcement ribs disposed in the recess.

A further embodiment of any of the foregoing airfoils, wherein at least one of the plurality of reinforcement ribs is curved between a leading edge of the airfoil and the cover mounting support.

A further embodiment of any of the foregoing airfoils, wherein the airfoil further comprises a porous material disposed between individual ones of the plurality of reinforcement ribs.

A turbofan engine includes a compressor section, a combustor section, a turbine section, and a fan section. The fan section has a plurality of airfoils connected to a fan hub, and each fan blade includes an airfoil body with a cover mounting support, a first cover, and a second cover. The airfoil body includes a solid perimeter portion surrounding a recess formed into at least one of a suction side and a pressure side of the airfoil body. The cover mounting support extends through the recess. The first cover is engaged with a first edge of the recess and joined to the cover mounting support by a first stir weld. The second cover is engaged with a second edge of the recess, and joined to the cover mounting support by a second stir weld.

The gas turbine engine of the preceding paragraph can optionally include, additionally and/or alternatively, any one or more of the following features, configurations and/or additional components:

A gas turbine engine according to an exemplary embodiment of this disclosure, among other possible things includes a compressor section in flow series with an upstream core inlet; a combustor section adapted to combine fuel with compressed air received from the compressor which is combusted to form a working fluid; a turbine section adapted to convert energy of the working fluid into rotation of at least one shaft;

and a fan section driven by rotation of the at least one shaft, the fan section including a plurality of airfoils connected to a fan hub, each of the plurality of airfoils comprising: an airfoil body including a solid perimeter portion surrounding a recess formed into at least one of a suction side and a pressure side of the airfoil body; a cover mounting support extending through the recess; a first cover engaged with a first edge of the recess and joined to the cover mounting support by a first stir weld; and a second cover engaged with a second edge of the recess, and joined to the cover mounting support by a second stir weld.

A further embodiment of the foregoing engine, wherein the first cover and the second cover define a central portion of a suction sidewall.

A further embodiment of any of the foregoing engines, wherein the airfoil further comprises: a third cover portion stir welded to the cover mounting support and to the first and second cover portions, the third cover portion bridging the first and second cover portions which together define the central portion of the airfoil sidewall.

A further embodiment of any of the foregoing engines, wherein the cover mounting support comprises: a spanwise rib extending from a root side to a tip side of the recess, the spanwise rib separating the recess into a forward portion and an aft portion.

A further embodiment of any of the foregoing engines, wherein the cover mounting support comprises: a plurality of spaced apart spanwise ribs.

A further embodiment of any of the foregoing engines, wherein the airfoil further comprises a plurality of curved reinforcement ribs disposed in at least one of the forward portion and the aft portion of the recess.

A further embodiment of any of the foregoing engines, wherein the engine further comprises: a porous material disposed between individual ones of the plurality of reinforcement ribs.

A method of making an airfoil includes providing an airfoil body with a solid perimeter portion surrounding a recess and a cover mounting support extending through the recess. A first cover piece is engaged with a first edge of the recess, and a second cover piece is engaged with a second edge of the recess opposite the first edge. At least the first cover piece and the second cover piece are joined to the cover mounting support by at least one stir weld.

The method of the preceding paragraph can optionally include, additionally and/or alternatively, any one or more of the following features, configurations and/or additional components:

A method according to an exemplary embodiment of this disclosure, among other possible things includes providing an airfoil body with a solid perimeter portion surrounding a recess and a cover mounting support extending through the recess; engaging a first cover piece with a first edge of the recess; engaging a second cover piece with a second edge of the recess opposite the first edge; and joining at least the first cover piece and the second cover piece to the cover mounting support by at least one stir weld.

A further embodiment of the foregoing method, further comprising: forming the recess into at least one of a suction side and a pressure side of the airfoil body.

A further embodiment of any of the foregoing methods, wherein the method further comprises bridging the first cover piece and the second cover piece with a third cover piece; and joining the third cover piece to the cover mounting support and the first and second cover pieces by at least one stir weld.

A further embodiment of any of the foregoing methods, wherein the step of joining the third cover piece includes stir welding a junction of the first and second cover pieces along the cover mounting support.

A further embodiment of any of the foregoing methods, wherein the cover mounting support comprises: a spanwise rib separating the recess into a forward portion and an aft portion.

A further embodiment of any of the foregoing methods, wherein the airfoil body also includes a plurality of reinforcement ribs disposed in at least one of the forward portion and the aft portion of the recess. A further embodiment of any of the foregoing methods, wherein the cover mounting support comprises: a plurality of spaced apart spanwise ribs.

A further embodiment of any of the foregoing methods, wherein the method further comprises placing a porous material between individual ones of the plurality of reinforcement ribs.

Although the present invention has been described with reference to preferred embodiments, workers skilled in the art will recognize that changes may be made in form and detail without departing from the spirit and scope of the invention.

The invention claimed is:

1. An airfoil comprising:
an airfoil body including a solid perimeter portion surrounding a recess formed into at least one of a suction side and a pressure side of the airfoil body, wherein the airfoil body extends in a spanwise direction of the airfoil from an attachment region of the airfoil to a tip region of the airfoil;
a cover mounting support extending through the recess;
a first cover engaged with a first edge of the recess and joined to a first portion of the cover mounting support by a first stir weld;
a second cover engaged with a second edge of the recess, and joined to a second portion of the cover mounting support by a second stir weld; and
a third cover disposed between the first and second cover, wherein the third cover is disposed at a mid-chord point of the airfoil and extends in a spanwise direction of the airfoil from the tip region of the airfoil to the attachment region of the airfoil.

2. The airfoil of claim 1, wherein the first cover and the second cover define a central portion of an airfoil sidewall surrounded by the perimeter portion of the airfoil body.

3. The airfoil of claim 2, wherein the airfoil sidewall is at least one of: a suction sidewall, and a pressure sidewall.

4. The airfoil of claim 2, wherein the third cover bridges the first and second cover, and forms a third portion of the airfoil sidewall.

5. The airfoil in claim 1, wherein the airfoil body comprises titanium or an alloy thereof.

6. The airfoil of claim 1, wherein the cover mounting support comprises a first rib extending spanwise from a root side to a tip side of the recess.

7. The airfoil of claim 6, wherein the cover mounting support further comprises a second spanwise rib equally spaced from the first spanwise rib from the attachment region to the tip region, wherein both of the first and second spanwise ribs are non-linear.

8. The airfoil of claim 6, wherein the cover mounting support separates the recess into a forward portion and an aft portion.

9. The airfoil of claim 1, further comprising:
a plurality of reinforcement ribs disposed in the recess, wherein at least one of the plurality of reinforcement ribs is curved between a leading edge of the airfoil and the cover mounting support.

10. The airfoil of claim 9, further comprising:
a porous material disposed between each rib of the plurality of reinforcement ribs.

11. The airfoil of claim 1, wherein the perimeter portion comprises a thickened region disposed on a leading edge of the perimeter portion and that is thickened in a chordwise direction of the airfoil, wherein the thickened region is disposed in an outer half of the airfoil that is opposite from the attachment region of the airfoil.

12. The airfoil of claim 1, further comprising:
wherein the perimeter portion comprises:
a trench disposed in the perimeter portion at the first edge of the recess; and
wherein the first cover comprises:
a cover edge;
a ridge disposed on the cover edge, wherein the ridge corresponds to the trench such that the trench and the ridge form a ship lap arrangement.

13. A turbofan engine comprising:
a compressor section in flow series with an upstream core inlet;
a combustor section adapted to combine fuel with compressed air received from the compressor section which is combusted to form a working fluid;
a turbine section adapted to convert energy of the working fluid into rotation of at least one shaft; and
a fan section driven by rotation of the at least one shaft, the fan section including a plurality of airfoils connected to a fan hub, each of the plurality of airfoils comprising:
an airfoil body including a solid perimeter portion surrounding a recess formed into at least one of a suction side and a pressure side of the airfoil body, wherein the airfoil body extends in a spanwise direction of the airfoil from an attachment region of the airfoil to a tip region of the airfoil;
a cover mounting support extending through the recess;
a first cover engaged with a first edge of the recess and joined to the cover mounting support by a first stir weld;
a second cover engaged with a second edge of the recess, and joined to the cover mounting support by a second stir weld,
a third cover disposed between the first and second cover, wherein the third cover is stir welded to the cover mounting support and to the first and second cover, the third cover bridging the first and second cover which together define a central portion of the suction sidewall, wherein the third cover is disposed at a mid-chord point of the airfoil and extends in a spanwise direction of the airfoil from the tip region of the airfoil to the attachment region of the airfoil.

14. The engine of claim 13, wherein the cover mounting support comprises:
a spanwise rib extending from a root side to a tip side of the recess, the spanwise rib separating the recess into a forward portion and an aft portion.

15. The engine of claim 14, wherein the cover mounting support comprises:
a plurality of spaced apart spanwise ribs.

16. The engine of claim 14, further comprising:
a plurality of curved reinforcement ribs disposed in at least one of the forward portion and the aft portion of the recess.

17. The engine of claim 16, further comprising:
a porous material disposed between each rib of the plurality of reinforcement ribs.

18. A method of making an airfoil, the method comprising:
providing an airfoil body with a solid perimeter portion surrounding a recess and a cover mounting support extending through the recess, wherein the airfoil body extends in a spanwise direction of the airfoil from an attachment region of the airfoil to a tip region of the airfoil;
engaging a first cover piece with a first edge of the recess;
engaging a second cover piece with a second edge of the recess opposite the first edge;
joining at least the first cover piece and the second cover piece to the cover mounting support by at least a first stir weld and a second stir weld,
bridging the first cover piece and the second cover piece with a third cover piece; and
joining the third cover piece to the cover mounting support and the first and second cover pieces by at least a third stir weld, wherein the third cover is disposed between the first and second cover pieces, wherein the third cover piece is disposed at a mid-chord point of the airfoil and extends in a spanwise direction of the airfoil from the tip region of the airfoil to the attachment region of the airfoil.

19. The method of claim 18, further comprising:
forming the recess into at least one of a suction side and a pressure side of the airfoil body.

20. The method of claim 18, wherein the step of joining the third cover piece includes stir welding a junction of the first and second cover pieces along the cover mounting support.

21. The method of claim 18, wherein the cover mounting support comprises:
a spanwise rib separating the recess into a forward portion and an aft portion.

22. The method of claim 21, wherein the airfoil body also includes a plurality of reinforcement ribs disposed in at least one of the forward portion and the aft portion of the recess.

23. The method of claim 21, wherein the cover mounting support comprises:
a plurality of spaced apart spanwise ribs.

24. The method of claim 22, further comprising:
placing a porous material between each rib of the plurality of reinforcement ribs.

\* \* \* \* \*